United States Patent [19]
Cebuliak et al.

[11] 3,863,150
[45] Jan. 28, 1975

[54] ELECTRICAL CURRENT FLOW INDICATOR

[75] Inventors: Steve E. Cebuliak; Clifford Harvey Leach; John Henry Westlake, all of Calgary, Alberta, Canada

[73] Assignee: Gentrix Engineering Ltd., Calgary, Albert, Canada

[22] Filed: June 22, 1973

[21] Appl. No.: 372,624

[52] U.S. Cl. .................................. 324/133
[51] Int. Cl. ............................... G01n 19/14
[58] Field of Search .............. 324/51, 133; 340/255; 317/18

[56] References Cited
UNITED STATES PATENTS

| | | | |
|---|---|---|---|
| 2,567,859 | 9/1951 | Ringo | 324/51 |
| 2,610,237 | 9/1952 | Benner | 324/51 X |
| 3,205,436 | 9/1965 | Donahue | 324/51 |
| 3,252,052 | 5/1966 | Nash | 317/18 D |
| 3,258,693 | 6/1966 | Meyer | 324/133 X |
| 3,450,947 | 6/1969 | Rogers | 340/255 X |

FOREIGN PATENTS OR APPLICATIONS

| | | | |
|---|---|---|---|
| 652,423 | 11/1962 | Canada | 324/51 |
| 233,431 | 5/1925 | Great Britain | 324/51 |

Primary Examiner—Gerard R. Strecker
Attorney, Agent, or Firm—Stanley G. Ade

[57] ABSTRACT

A circuit which shows firstly that line voltage is present at the indicator and secondly, whether or not the power dissipating device is in fact drawing power from the current source. The device may be encapsulated with a plug having male and female connections on either end or may be formed integrally within one end or the other of an extension cord.

2 Claims, 2 Drawing Figures

3,863,150

ELECTRICAL CURRENT FLOW INDICATOR

BACKGROUND OF THE INVENTION

This invention relates to new and useful improvements in electrical current flow indicators, and although it is designed primarily for use in conjunction with such devices as "plug-in" automobile block heaters, nevertheless it will be understood that it can be incorporated in any circuitry which includes power dissipating devices in order to indicate visually whether or not current is in fact flowing through the device.

SUMMARY OF THE INVENTION

The operation of automobiles or other vehicles in relatively cold climates has increased considerably over recent years, necessitating some method of maintaining the coolant at a temperature above ambient temperatures so that the starting of such engines may be facilitated. Conventionally, electrical immersion heaters are fitted into the engine block or radiator hoses and are adapted to be connected to a source of power such as a conventional 117 volt 60 Hz supply.

The heaters used normally are simple resistive elements designed to accept such standard voltage and may dissipate in the neighborhood of 100 to 1,000 watts depending upon the design parameters.

Such heaters conventionally incorporate a line cord extending from the heater to the front of the radiator, terminating in a male plug which is connected when the heater is in use, by an extension cord to any convenient plug-in receptacle which in turn is connected to the source of electrical energy. These line cords from the heaters are usually plugged into the heater and are routed along the engine to the front of the radiator and occasionally they become unplugged at the heater due to vibration or the like.

Typical installations incorporate outlet boxes adjacent house driveways or in garages and in certain areas, such receptacles are provided in parking areas so that the car may be "plugged in" while parked, thus facilitating starting.

Unfortunately, the provision of extension cords increases the danger of poor connections occurring together with the possibility, of course, that the resistive element may burn out occasionally. Either of these conditions often causes the engine to fail to start when a driver has depended upon the fact that the immersion heater has been operating.

In other words, the operator normally depends upon the engine heater which may have become inoperative due to faulty heater elements, faulty connections between the extension cord and the line cord connected to the heater, faulty connection between the extension cord and the power outlet box, or simply a supply fuse or circuit breaker having been tripped for various reasons. Also, the continual use of extension cords under extremely cold climatic conditions often causes cracking or open breaks between the ends of the extension cord. The result may be, particularly under severe climatic conditions, that the vehicle will not start as expected not only causing considerable inconvenience, but occasionally causing damage to the engine particularly if the coolant is not sufficiently reinforced with an antifreeze additive capable of withstanding the ambient temperature. Furthermore, with a car or other vehicle standing for long periods in extremely cold weather conditions, the engine oil often thickens to the point where the conventional starter battery will not turn the engine sufficiently to enable it to start.

The primary object of the present invention is to provide a device of the character herewithin described which will indicate visually, to the operator, whether or not the electrical engine heater is in fact drawing current from the power source and therefore may be considered operational.

A further object of the invention is to provide a device of the character herewithin described that provides a second visual indication to advise the operator of the presence or the absence of line voltage at the point where the device is connected. This means that the operator will receive a visual (LINE) indication of the presence of line voltage upon his making connection to a source of electrical power. When he subsequently connects an electrical load to the device, another visual (LOAD) indication is provided by the device if the connected load is, in fact, drawing electrical current. This arrangement facilitates the isolating of faults by the operator, in that the absence of a visual indication labelled "LINE" implies that the source of power is inoperative, or his connection to said source is not electrically adequate.

A further object of the invention is to provide a device of the character herewithin described which may be adapted for use with an electrical device drawing a load current regardless of the strength of this current always providing of course that the ratings of the individual components are adjusted to suit the load current.

A still further object of the invention is to provide a device of the character herewithin described which is particularly suitable for use with automotive block heater extension cords, the device being adapted to be incorporated in either end of the extension cord.

A still further object of the invention is to provide a device of the character herewithin described, which may be adapted for use in applications where a second electrical circuit is to be energized or de-energized depending upon whether or not a first circuit is drawing electrical current. Here, a typical application would be the turning on of household lights, for burglar protection, whenever the owner's refrigerator or freezer automatically switched on.

A still further object of the invention is to provide a device of the character herewithin described which is simple in construction, economical in manufacture, and otherwise well suited to the purpose for which it is designed.

With the foregoing objects in view, and other such objects and advantages as will become apparent to those skilled in the art to which this invention relates as this specification proceeds, my invention consists essentially in the arrangement and construction of parts all as hereinafter more particularly described, reference being had to the accompanying drawings in which:

DESCRIPTION OF THE DRAWINGS

In the drawings like characters of reference indicate corresponding parts in the different figures.

DETAILED DESCRIPTION

Figure 1:
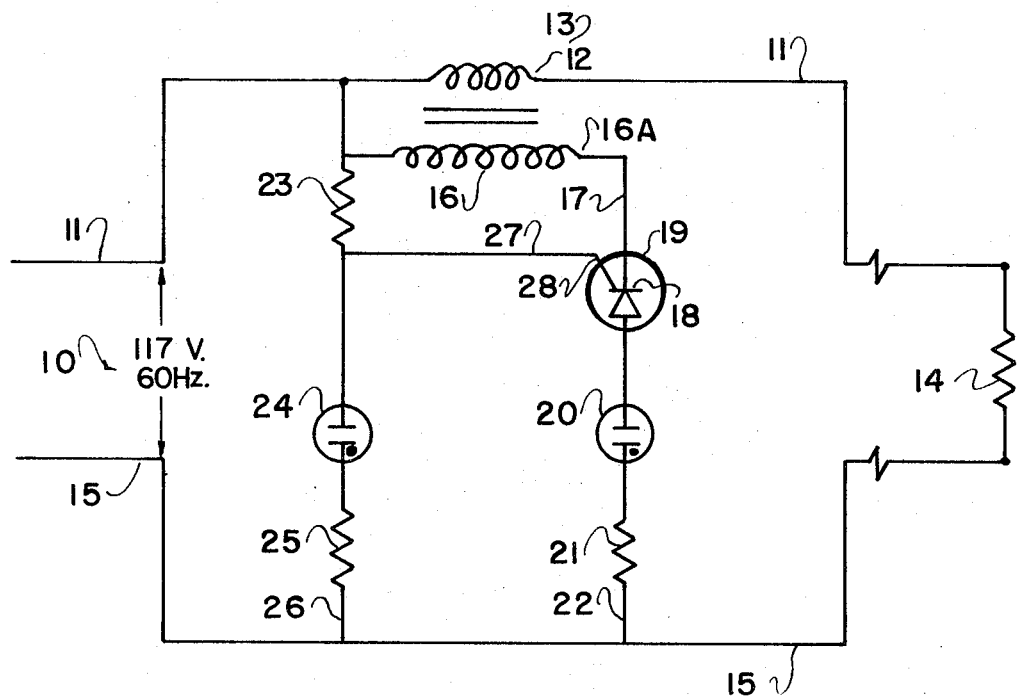
FIG. 1 is a schematic view of the circuitry of the device shown in conjunction with a source of electrical energy and a load.
Figure 2:
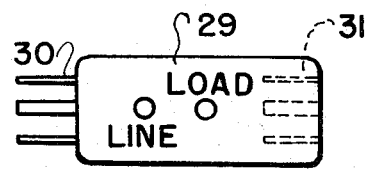
FIG. 2 is a front elevation of one example of the device incorporated in a convenient guise.

Proceeding therefore to describe the invention in detail, reference should be made to FIG. 1 in which 10 indicates generally a source of electrical energy such as a conventional 117 volt 60 Hz supply normally available as household voltage from a convenience outlet box (not illustrated).

One line 11 extends to the primary winding 12 of a step-up transformer collectively designated 13, and from the primary winding the line 11 extends to one side of the load 14 which may take the form of a resistive element $R_L$.

The other side of the load 14 is connected by a conductor or line 15, to the other side of the electrical supply 10 as clearly indicated.

The secondary winding 16 of the step-up transformer is connected by one end thereof to the line 11 and by the other end thereof, via a conductor 17, to the cathode 18 of a Silicon Controlled Rectifier (SCR) 19. This rectifier is in series with a neon glow lamp 20 ($L_2$) through a current limiting resistor 21 ($R_1$), conductor 22 completing the circuit between the lines or conductors 11 and 15.

The other part of the circuit comprises a resistor 23 ($R_2$), a neon glow lamp 24 ($L_1$) and a resistor 25 ($R_3$) connected in series across lines 11 and 15, with conductor 26 completing the circuit. Between resistor 23 and lamp 24, there is connected one end of a conductor 27, the other end of which is connected to the gate 28 of the SCR.

The connections and design parameters of the circuitry cause the neon lamp 24 to glow if lines 11 and 15 are connected to a source of electrical power, while neon lamp 20 will glow only if the load 14 is drawing current from the main source 10. Both lamps will glow, then, if current is being drawn by the load 14.

With lines 11 and 15 connected to a power source 10, and with no load current being drawn by $R_L$ (14), then lamp 24 will glow because there is a complete circuit through this lamp. During the negative half cycle (with respect to point C) of the 60 Hz source voltage, electron flow down through resistor 23 will obtain a positive polarity at its lower end, which point is connected to the gate 28 of the SCR. Noting the voltage dividing action between the resistor 23 and the combination of lamp 24 and resistor 25, the gate 28 of the SCR will not be sufficiently positive to cause the SCR to conduct, even though there is an electrical path, including the SCR's cathode and anode, across the live lines 11 and 15.

When a load current is being drawn by resistor loader 14, continuity through the primary winding 12 of transformer 13 causes, during the negative excursion of the line voltage, the stepped-up secondary (16) winding to apply a negative potential to the cathode 18 of the SCR 19. This causes the cathode 18 to obtain a voltage, adequate with respect to magnitude and polarity, to fire the SCR, thus providing the required continuity to cause 20 to glow. During the positive excursion of the line voltage, the SCR will not fire because it will be reverse biased.

Thus, each time the load current causes the SCR to fire on a negative impulse, the lamp 20 will glow; and if the supply frequency is 60 Hz, then lamp 20 will glow 60 times a second, providing a visual indication that load current is, in fact, being drawn by the load resistor 14.

The reason for maintaining a slightly positive quiescent gate 28 potential, by means of the voltage dividing action previously described, is so that the circuit will operate properly with a lower SCR cathode potential (and hence fewer turns on secondary 16) than would otherwise be the case.

The device hereinbefore described may, of course, be contained in a housing 29 having a male connection 30 at one end and a female connection 31 at the other, thus enabling it to be inserted into the circuitry of an engine heater such as illustrated at 14. Alternatively, it may be incorporated into one end or the other of an extension cord (not illustrated) by means of one or the other of conventional encapsulating processes.

It should be stressed, of course, that the circuitry described, although designed primarily for use with engine heaters, nevertheless may be incorporated in any device which draws a reasonable amount of current during the operation thereof.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What we claim as our invention is:

1. An indicator for use with electrical power dissipating devices and a source of line voltage for indicating firstly the presence of line voltage and secondly, whether or not the electrical power dissipating device is drawing current from the line of voltage source said indicator comprising in combination, means to connect said indicator to a source of line voltage and means to connect said indicator to an electrical power dissipating device, said first means including a pair of conductors connected to said first means and to said second means, a first circuit across said conductors, said first circuit including visual line voltage indicating means and a second circuit also across said conductors between said first circuit and said second means, to visually indicate electrical power dissipation across said conductors, said second circuit including a step up transformer having primary and secondary windings, said primary winding being in series with one of said conductors, a silicon controlled rectifier including a cathode, a gate and an anode, said secondary winding being connected to the line voltage input side of said primary winding and to said cathode, a neon glow lamp and resistor in series with said silicon controlled rectifier anode and connecting with the other of said conductors and means to control the conducting characteristics of said gate, said last mentioned means including a resistor in series between said line voltage input side of said one conductor and said gate of said silicon controlled rectifier, said last mentioned resistor preventing said silicon controlled rectifier from conducting unless said power dissipating device is drawing current, the connection of said power dissipating device to draw current operating said secondary winding of said transformer and providing sufficient polarity to said cathode of said silicon controlled rectifier to cause said silicon controlled rectifier to conduct thereby operating said neon glow lamp.

2. The indicator according to claim 1 in which said first circuit includes a load limiting resistor and a further neon glow lamp in series across said conductors.

* * * * *